(12) United States Patent
Foti (10) Patent No.: US 9,490,990 B2
(45) Date of Patent: Nov. 8, 2016

(54) METHOD AND APPARATUS FOR MACHINE-TO-MACHINE EVENT DATA RECORDING

(71) Applicant: Telefonaktiebolaget L M Ericsson (publ), Stockholm (SE)

(72) Inventor: George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 716 days.

(21) Appl. No.: 13/922,938

(22) Filed: Jun. 20, 2013

(65) Prior Publication Data

US 2013/0343231 A1    Dec. 26, 2013

Related U.S. Application Data

(60) Provisional application No. 61/663,192, filed on Jun. 22, 2012.

(51) Int. Cl.
*H04L 12/14* (2006.01)
*H04L 12/24* (2006.01)
(Continued)

(52) U.S. Cl.
CPC ......... *H04L 12/1407* (2013.01); *H04L 41/069* (2013.01); *H04L 65/1073* (2013.01); *H04W 4/005* (2013.01); *H04L 12/1403* (2013.01); *H04L 12/1482* (2013.01); *H04L 61/106* (2013.01)

(58) Field of Classification Search
CPC ........... H04L 12/1407; H04L 12/1403; H04L 12/1482; H04L 12/14; H04L 41/069; H04L 65/1073; H04L 61/106
See application file for complete search history.

(56) References Cited

U.S. PATENT DOCUMENTS

2013/0336222 A1* 12/2013 Lu ..................... H04W 72/00
370/328

FOREIGN PATENT DOCUMENTS

WO        2013102890 A1      7/2013

OTHER PUBLICATIONS

Author Unknown, "Recording Information for Statistical and Offline Charging in M2M," Ericsson; ETSI; M2M(12) 19_072r2; Change Request; 102 690 version 2.0.1 CR M2M(12)19_072r2 rev. 2; Mar. 23, 2012. pp. 1-9.

(Continued)

*Primary Examiner* — Ian N Moore
*Assistant Examiner* — Brian T Le
(74) *Attorney, Agent, or Firm* — Murphy, Bilak & Homiller, PLLC (57) ABSTRACT

According to example teachings herein, a Machine-to-Machine (M2M) event recording function records M2M events for a Network Services Capability Layer (N-SCL) in an M2M network. In an example configuration, the recording function considers certain M2M information elements as mandatory for recording with respect to a given M2M event, while others are optional according to configuration information that controls M2M event recording. Each such recorded M2M event includes a number of M2M information elements that are mandatory, and optionally includes one or more additional information elements. In at least one embodiment, the mandatory M2M information elements allow M2M network events to be correlated with corresponding events in an access network used to access the M2M network. The recorded M2M events can be also correlated at the M2M service layer to fulfill certain billing needs, for catering to the potentially large number of diverse applications that can utilize the M2M network.

28 Claims, 5 Drawing Sheets

(51) Int. Cl.
*H04W 4/00* (2009.01)
*H04L 29/06* (2006.01)
*H04L 29/12* (2006.01)

(56) References Cited

OTHER PUBLICATIONS

Author Unknown,"Recording Requirements," Ericsson; ETSI; M2M(12)20_71; Change Request; 102 689 Version 1.1.2 CR M2M(12)20_0XX rev. 1; May 25, 2012. pp. 1-3.

Author Unknown, "TS 101 603—3GPP Connectivity and 3GPP Services," VODAPHONE Group Plc; ETSI; M2M (12)20_057r2; Jun. 6, 2012. pp. 1-3.

European Telecommunications Standards Institute, ETSI TS 102 690 V2.0.11 (Nov. 2012); Machine-to-Machine communications (M2M); Functional architecture, Nov. 2012, pp. 1-308, vol. 2.0.11, ETSI, Sophia Antipolis Cedex, France.

3rd Generation Partnership Project. 3GPP TS 32.240 V8.6.0 (Jun. 2010). "3rd Generation Partnership Project; Technical Specification Group Services and System Aspects; Telecommunication management; Charging management; Charging architecture and principles (Release 8)" Jun. 2010, pp. 1-44.

3rd Generation Partnership Project. 3GPP TS 32.299 V8.9.0 (Dec. 2009) "3rd Generation Partnership Project; Technical Specification Group Service and System Aspects; Telecommunication management; Charging management; Diameter charging applications (Release 8)" Dec. 2009, pp. 1-142.

European Telecommunications Standards Institute. ETSI TS 102 690 V1.1 .1 (Oct. 2011). Machine-to-Machine communications (M2M); Functional architecture, Oct. 2011, pp. 1-280, Sophia Antipolis Cedex, France.

Unknown, Author, "Introducing the Charging Data of NA", ETSI, M2M(12)19_077r1, Change Request, 102 690 Version 2.0.1 CR CR_77 rev 1, Huawei Technologies, May 30, 2012, pp. 1-2.

* cited by examiner

| Information Element | Mandatory/ optional | Description |
|---|---|---|
| M2M Subscription Identifier | M | The M2M Subscription ID associated with the request |
| Application ID | CM | The M2M Application ID associated with the request if applicable |
| Receiver | M | Receiver of an M2M request (can be an NA or D/GSCL) |
| Issuer | M | Issuer of the M2M request (can be an NA or D/GSCL) |
| Hosting SCL | O | The hosting SCL for the request in case the receiver is not the host, where applicable |
| Target ID | M | The target URL for the M2M request |
| Protocol Type | O | HTTP or CoAP |
| Primitive Type | M | Request Type |
| Request Headers size | O | Number of bytes for the headers in the Request |
| Request Body size | O | Number of bytes of the body transported in the Request if applicable |
| Response Headers size | O | Number of bytes for the headers in the Response |
| Response Body size | O | Number of bytes of the body transported in the Response if applicable |
| Response Code | O | |
| Time Stamp | M | The time for the recording the M2M event |
| M2M-Event-Tag | M | A Tag for the M2M event for classification purposes |
| Control Memory Size | O | Storage Memory in bytes, where applicable, to store control related information associated with the recorded M2M event (excludes data storage associated with container related operations) |
| Data Memory Size | O | Storage Memory in Kbytes, where applicable, to store data associated with container related operations |
| Access Network Identifier | M | Identifier of the access network associated with the recorded M2M event |
| Additional Information | O | Vendor specific information |
| IP ADDR of AN Bearer Creator | O | IP address of the M2M entity that created an Access Network (AN) bearer with respect to the M2M event |

M = Mandatory, CM = Conditionally Mandatory, O = Optional

FIG. 5

METHOD AND APPARATUS FOR MACHINE-TO-MACHINE EVENT DATA RECORDING

RELATED APPLICATIONS

This application claims priority from the U.S. provisional patent application filed on 22 Jun. 2012 and assigned Application No. 61/663,192, which is incorporated herein by reference.

TECHNICAL FIELD

The present invention generally relates to Machine-to-Machine (M2M) networks, and particularly relates to mechanisms for M2M event data recording, e.g., for statistical processing and/or offline charging.

BACKGROUND

Machine-to-Machine (M2M) services may be accessed using an access network, such as a cellular or other wireless communication network. In such scenarios, a given M2M entity connects to the M2M network through the access network. Determining how to bill for M2M services that are accessed in this manner is simplified in the case where the M2M service provider and the access network provider are one and the same. However, when the M2M service provider and the access network provider are not the same, a number of difficulties arise with respect to billing. For example, the M2M service provider may not have access to all of the relevant data from the access network. The lack of relevant access network information limits the flexibility available in billing. Furthermore, given the multitude of different applications that can potentially utilize the M2M framework, there is a need to support flexible structures to fulfill different billing needs.

To better understand the difficulties arising in ensuring that the M2M service provider records the proper events to allow for accurate charging and flexible charging structures, the following public documents are herein incorporated in their entirety by reference: 3GPP TS 32.240 "3rd Generation Partnership Project; Technical Specification Group Services and System Aspects; Telecommunication management; Charging management; Charging Architecture and principles;" and 3GPP TS 32.299 "3rd Generation Partnership Project; Technical Specification Group Services and System Aspects; Telecommunication management; Charging management; Diameter charging applications."

SUMMARY

Among their several advantages, the method and apparatus taught herein obviate or mitigate the aforementioned billing difficulties, based on recording Machine-to-Machine (M2M) events for a Network Services Capability Layer (N-SCL) within the M2M network. According to example teachings, an M2M event recording function records a number of Machine-to-Machine (M2M) information elements associated with given M2M events involving the N-SCL. In an example configuration, the recording function considers certain M2M information elements as mandatory, while others are optional according to configuration information used by the recording function to control M2M event recording. Thus, in this example configuration, each recorded M2M event includes a number of M2M information elements that are mandatory, and optionally includes one or more additional information elements. In at least one embodiment, the mandatory M2M information elements allow M2M network events to be correlated with corresponding events in an access network. Furthermore, the recorded M2M events can be also correlated at the M2M service layer to fulfill certain billing needs, for catering to the potentially large number of diverse applications that can utilize the M2M network.

One contemplated embodiment comprises a method of recording M2M events at an N-SCL within an M2M network. Each M2M event will be understood as comprising an M2M request and may further comprise an M2M response to the M2M request. The method includes, for a given M2M event, initiating recording of the given M2M event responsive to the M2M request. Further, the method includes recording the given M2M event by recording a number of M2M information elements associated with the M2M request, to thereby obtain a recorded M2M event corresponding to the given M2M event. The number of M2M information elements recorded for the given M2M event include: an access network identifier (ID) associated with the M2M request; an M2M event tag characterizing an event class associated with the M2M request; an M2M subscription ID associated with the M2M request; an M2M application ID associated with the M2M request; a time stamp associated with the M2M request; a primitive type of the associated M2M request; and an issuer of the M2M request, a receiver targeted by the M2M request, and a target Uniform Resource Locator (URL) identifying the target resource associated with the M2M request. Note that the M2M request in any given M2M event can be any request received or initiated by the N-SCL, to fulfill any given need.

The method further includes performing at least one of the following: processing the recorded M2M events to obtain M2M event statistics at the N-SCL; and transferring the recorded M2M events, or Call Data Records (CDRs) derived therefrom, from the N-SCL to a charging server for charging.

Another contemplated embodiment comprises a network server in an M2M network, wherein the network server implements an N-SCL for an M2M network and includes an interface and a processor. The interface is configured for communicating with other M2M entities within the M2M network, while the processor is operatively associated with the interface and configured to implement an M2M event recording function that is configured to record M2M events.

The recording function is, for any given M2M event, configured to initiate recording of the given M2M event responsive to the M2M request, and to record the given M2M event by recording a number of M2M information elements associated with the M2M event, to thereby obtain a recorded M2M event corresponding to the given M2M event. As with the above-described method, the M2M information elements recorded for any given M2M event may comprise a number of mandatory M2M information elements and a number of optional information elements. In one example, the recording function treats certain M2M information elements as mandatory, to be recorded for each M2M event, while it treats other M2M information elements as being optionally recorded according to configuration details embodied in the configuration information.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

FIG. 5 is a table illustrating one embodiment of mandatory and optional M2M information elements, as recorded for any given M2M event.

DETAILED DESCRIPTION

Figure 1:
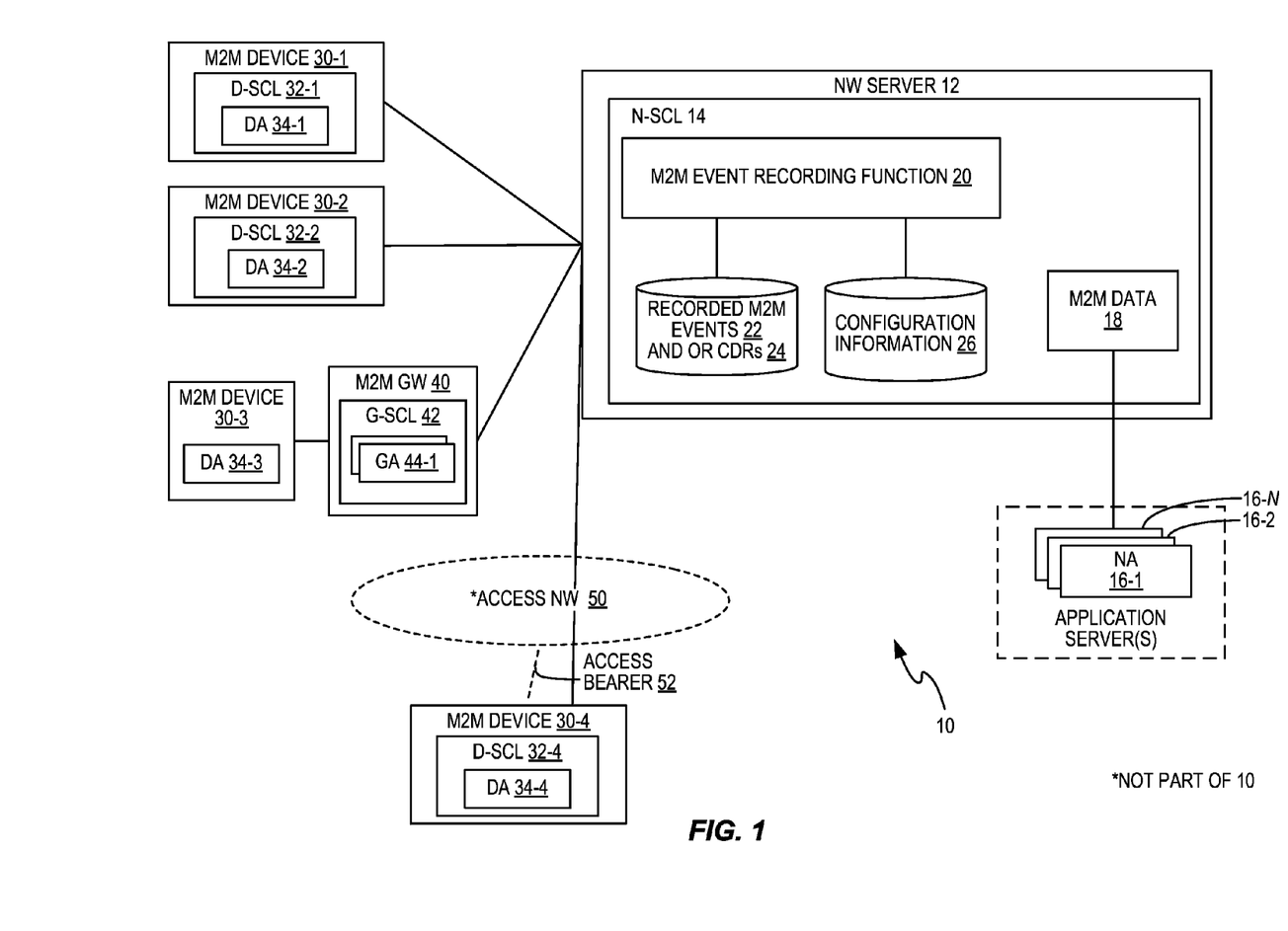
FIG. 1 is a block diagram of one embodiment of a Machine-to-Machine (M2M) network comprising various M2M entities, including a Network Services Capability Layer (N-SCL) that is configured according to the teachings herein.

FIG. 1 illustrates one embodiment of a Machine-to-Machine (M2M) network 10 that includes a network server 12, which implements a Network Services Capability Layer (N-SCL) 14. In turn, the N-SCL 14 supports one or more network applications 16, which are shown by way of example in the diagram as "NA 16-1" through "NA 16-N," where "NA" denotes "network application." The N-SCL 14 holds or otherwise maintains M2M data 18. In an example case, the M2M data 18 can be understood as representing various data stores or data structures, where individual ones of those data stores or structures are owned or controlled by different M2M entities within the M2M network 10, such as any one or more of a network application 16, the N-SCL 14, an M2M device SCL, or an M2M gateway SCL. Thus, the M2M data 18 may represent data for one M2M entity or any number of M2M entities.

The N-SCL 14 further implements an M2M event recording function 20, which is configured to perform M2M event recording according to the teachings herein. In that respect, the M2M event recording function 20 stores recorded M2M events 22 corresponding to respective "M2M events" and/or stores "Call Data Records (CDRs) 24 that are derived from recording M2M events. The M2M event recording function 20 is further associated with configuration information 26. As an example, certain portions of the configuration information 26 control which M2M information elements the M2M event recording function 20 records for given M2M events.

The diagram illustrates further example details for the M2M network 10, including one or more M2M devices 30 that may connect directly to the N-SCL 14—shown by way of example as an M2M device 30-1 implementing a device SCL (D-SCL) 32-1, which hosts a device application 34-1, and an M2M device 30-2 implementing a D-SCL 32-2, which hosts a device application 34-2. Of course, a given M2M device 30 and its D-SCL 32 may host more than one device application 34.

Additionally or alternatively, an M2M device 30 may not implement a D-SCL 32. Instead, the device applications 34 hosted by such an M2M device 30 use a gateway SCL (G-SCL) 42 in an M2M gateway 40 to which the M2M device 30 is connected. One sees an example of this arrangement in FIG. 1, where the M2M device 30-3 connects to the M2M gateway 40, which in turn connects to the N-SCL 14. The G-SCL 42 of the M2M gateway 40 also may host one or more gateway applications 44. One such gateway application is shown in FIG. 1 as "GA 44-1."

Additionally or alternatively, one or more M2M devices 30 may connect to the M2M network 10 through an access network 50, which generally is not part of the M2M network 10, and which may be operated by a service provider different than the service provider that provides the M2M network 10. FIG. 1 illustrates an example of this scenario, wherein an M2M device 30-4 connects to the M2M network 10 through the access network 50. The M2M device 30-4 implements a D-SCL 32-4 and hosts a device application 34-4. To communicate with the M2M network 10, an access bearer 52 must first be established between the M2M device 30-4 and the access network 50, and it will be understood that the M2M device 30-4 generally will have certificates or other access credentials for being authenticated by the access network 50, for such connections.

The N-SCL 14, the network applications 16, the D-SCLs 32 and the device applications 34, and the G-SCLs 42 and the gateway applications 44, all may be considered as respective, individual M2M entities within the M2M network 10. Various ones of these M2M entities conduct or are otherwise involved in M2M events within the M2M network 10 and the N-SCL 14, e.g., by virtue of the M2M event recording function 20, is configured to record M2M events, by recording certain M2M information elements as a recorded M2M event 22, for any given M2M event being recorded by the M2M event recording function 20.

Figure 2:
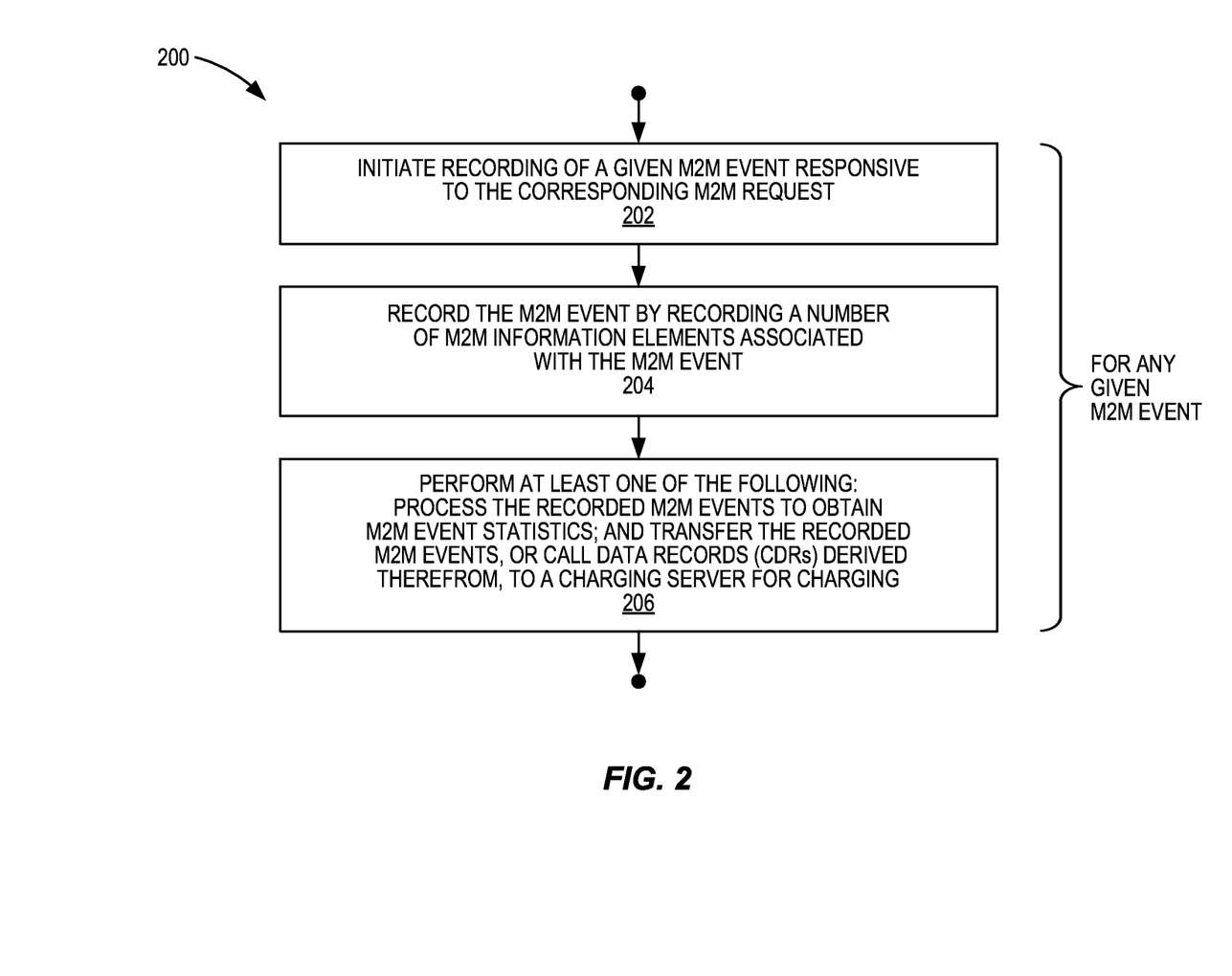
FIG. 2 is a block diagram of one embodiment of a method performed by an M2M event recording function that is implemented in the N-SCL of FIG. 1, for example.

FIG. 2 illustrates an example method 200 for recording M2M events for an N-SCL 14 in an M2M network 10. Each such M2M event comprises an M2M request, e.g., generated at or received by the N-SCL 14. Any given M2M event to be recorded may be further considered as comprising the corresponding M2M response, or more generally as comprising the request and associated processing or activity, including any response message or other operation(s) triggered by the request. The method 200 is performed by the M2M event recording function 20, which is shown by way of example in FIG. 1 as being implemented within or in communication with the N-SCL 14 at the network server 12.

The method 200 for a given M2M event to be recorded includes initiating recording of the given M2M event responsive to the M2M request (Block 202). The method 200 further includes recording the given M2M event by recording a number of M2M information elements associated with the given M2M event. At least a portion of such recording may be based on information in the M2M request and/or the corresponding M2M response, irrespective of whether the request is initiated or received by the N-SCL 14. The M2M event recording function 20 thereby obtains a recorded M2M event 22 corresponding to the given M2M event (Block 204). The M2M information elements recorded as the M2M recorded event 22 include: an access network identifier (ID) associated with the M2M request, such as the identifier of the access network 50; an M2M event tag characterizing an event class associated with the M2M request; an M2M subscription ID within the M2M domain and associated with the M2M request; an M2M application ID, if any, associated with the M2M request; a time stamp associated with the M2M request; a primitive type of the associated M2M request; and an issuer of the M2M request, a receiver targeted by the M2M request, and a target Uniform Resource Locator (URL) that is associated with the M2M request and identifies the resource targeted by the M2M request. These M2M information elements may be considered as being mandatory for recording, for any given M2M event being recorded.

The method 200 further includes performing (Block 206) at least one of the following: processing the recorded M2M events 22 to obtain M2M event statistics; and transferring the recorded M2M events 22, or CDRs 24 derived therefrom, to a charging server for charging.

The M2M event recording function 20 may be configured to record all M2M events involving the N-SCL 14, or to record M2M events of a certain type, or M2M events occurring at certain times or involving certain access networks, or involving certain M2M entities or groups thereof. Of course, these qualifications can be combined, e.g., so that M2M events of certain types or involving certain M2M entities are recorded. As will be seen later, whether a given M2M event is recorded and/or the particular M2M information elements recorded for that event can be configured will depend on the type or particulars of the corresponding M2M request.

For any given M2M event that involves the creation of an access bearer 52 in an access network 50 by an M2M entity involved in the given M2M event, the method 200 may further include recording in the corresponding recorded M2M event 22 information that identifies an IP address of the M2M entity. As an example, for any given M2M event that comprises a registration event, in which an M2M entity registers with the N-SCL 14, the method 200 in at least one embodiment further comprises obtaining an IP address of the M2M entity from M2M Point-of-Contact (PoC) information provided to the N-SCL 14 during the registration event and including in the corresponding recorded M2M event 22 information that identifies the IP address.

For any given M2M event that comprises a data storage resource consumption event involving M2M data 18, e.g., M2M application data, stored at the N-SCL 14, the method 200 may further comprise including in the corresponding recorded M2M event 22 information that identifies an M2M entity that stored the M2M data 18, information that identifies any M2M entity that deleted the M2M data 18, and information that indicates a duration of time that the M2M data 18 was stored at the N-SCL 14, as well as the storage amount being utilized during that time duration.

For any given M2M event that comprises a data transfer event involving M2M data 18 being stored at or retrieved from the N-SCL 14, the method 200 may further comprise including in the corresponding recorded M2M event 22 information that identifies the M2M entity that stored or retrieved the M2M data 18 and information that indicates an amount of information transferred in the data transfer event. In at least one such embodiment the additional information recorded for the data transfer event indicates an amount of M2M data 18 transferred for the data transfer event and further indicates an amount of control information (related to the data transfer event) transferred for the data transfer event. Thus, the recorded M2M event 22 includes information that would allow billing for the amount of actual M2M data transferred, based on knowing how much of the overall data transfer was M2M data 18 versus overhead (i.e., control information).

For any given M2M event that comprises a connectivity event involving an M2M entity connecting to the N-SCL 14 for data storage or retrieval, the method 200 may further comprise including in the corresponding recorded M2M event 22 information that identifies the connecting M2M entity.

The method 200 according to any of the above embodiments may further include controlling M2M event recording by the M2M event recording function according to configuration information 26 that configures M2M event recording by the M2M event recording function 20, based on specifying which M2M information elements are recorded for which M2M events according to one or more of parameters.

Such parameters include: the type of M2M event being recorded; the type or identity of the M2M entity that issued the M2M request corresponding to the M2M event being recorded; the identity or group association of the M2M entity that issued the M2M request; and the type or identity of the M2M entity targeted as the receiver of the M2M request corresponding to the M2M event being recorded. As noted, some number of specific M2M information elements may be considered as being mandatory to record for any given M2M event being recorded, while others are considered as being optional in dependence on the configuration information 26.

That is, an owner or operator of the network server 12/N-SCL 14 uses the configuration information 26 to control which optional M2M information elements are recorded for M2M events, based on setting one or more parameters in the configuration information 26. As such, it will be appreciated that the configuration information 26 controls which additional M2M information elements beyond the mandatory ones are optionally recorded for any given M2M event being recorded.

In one example, the configuration information 26 controls which ones of the following M2M information elements are recorded as the additional M2M information elements that are optionally recorded for any given M2M event being recorded: an indicator of the SCL 14, 32, or 42 hosting the resource targeted by the M2M request (in case the N-SCL 14 does not host the resource identified in the M2M request); a protocol type of the associated M2M request; a header size of the associated M2M request; a header size of the M2M response sent in response to the associated M2M request; a body size of the associated M2M request; a body size of the M2M response; a response code corresponding to the M2M response; a control memory size indicating the amount of memory needed to store control information associated with the M2M event being recorded; a data memory size indicating the amount of memory needed to store data associated with the M2M event being recorded; and additional vendor-specific information particular to an operator or owner of the N-SCL 14.

In at least one embodiment, the M2M information elements recorded for any given M2M event according to the method 200 include the M2M IDs for all M2M entities involved in the given M2M event. Again, an M2M entity may be any M2M application or an SCL that is involved in the M2M request and/or the M2M response corresponding to the M2M event being recorded. Recording all such M2M identities as part of the method 200 supports later charging of any given M2M event to any one or more of the M2M entities that were recorded as being involved in the event.

The method 200 may further include the M2M event recording function 20 maintaining the following associations: associations between device SCL identifiers (D-SCL IDs) and correspondingly allocated M2M subscription IDs, associations between gateway SCL identifiers (G-SCL IDs) and correspondingly allocated M2M subscription IDs, associations between device application IDs (DA IDs), gateway application IDs (GA IDs), and network application IDs (NA IDs), and correspondingly allocated M2M subscription IDs. Further according to such embodiments of the method 200, the M2M event recording function 20 determines the M2M subscription ID associated with any given M2M request based on the associations.

It will be understood that the method 200 is implemented via an appropriately configured network server 12 or other computing platform, which implements the M2M event recording function 20. In an example implementation, the network server 12 implements the N-SCL 14 and comprises an interface for communicating with other M2M entities within the M2M network, e.g., for communicating with applications and other SCLs, and further includes a processor operatively associated with the interface. The processor implements the M2M event recording function 20, for recording M2M events according to the teachings herein.

Each M2M event comprises an M2M request and may further comprise an M2M response. The "response" may comprise an outgoing message and/or processing triggered by the M2M request. For a given M2M event among M2M events being recorded, the M2M event recording function 20 is configured to initiate recording of the given M2M event responsive to the M2M request, and to record the given M2M event by recording a number of M2M information elements associated with the M2M event. The M2M event recording function 20 thereby obtains a recorded M2M event 22 corresponding to the given M2M event. The recorded M2M event 22 includes a number of M2M information elements that, for example, allow M2M network events to be correlated with corresponding access network events, e.g., for billing or other reconciliations. Additionally or alternatively, the recorded M2M events 22 are processed by the M2M event recording function 20 to obtain M2M event statistics, which may be used for characterizing network usage, etc.

In one or more embodiments, the M2M event recording function 20 is configured to record at least the following M2M information elements: an access network ID associated with the M2M request; an M2M event tag characterizing an event class associated with the M2M request; an M2M subscription ID associated with the M2M request; an M2M application ID, if any, associated with the M2M request; a time stamp associated with the M2M request; a primitive type of the associated M2M request (the primitive type identifies the request, such as SCL_CREATE_REQUEST or APPLICATION_CREATE_REQUEST); and an issuer of the M2M request, a receiver targeted by the M2M request, and a target Uniform Resource Locator (URL) identifying the target resource associated with the M2M request.

Further, the M2M event recording function 20 is configured to perform at least one of the following: process the recorded M2M events 22 to obtain M2M event statistics; and transfer the recorded M2M events 22, or CDRs 24 derived therefrom, to a charging server for charging. Of course, it will be understood that the M2M event recording function 20 may be configured to carry out any or all of the variations of the method 200, as described above and that the network server 12 which implements such functionality will include or otherwise provide access to a computer-readable medium or media, for storing the recorded M2M events 22, any derived CDRs 24 and the configuration information 26. The same or other medium in or accessible to the network server 12 is used in one or more embodiments for storing computer program instructions, the execution of which by the network server processor implements M2M event recording according to the teachings herein, i.e., implements the disclosed M2M event recording function 20 within or in association with the N-SCL 14.

Figure 3:
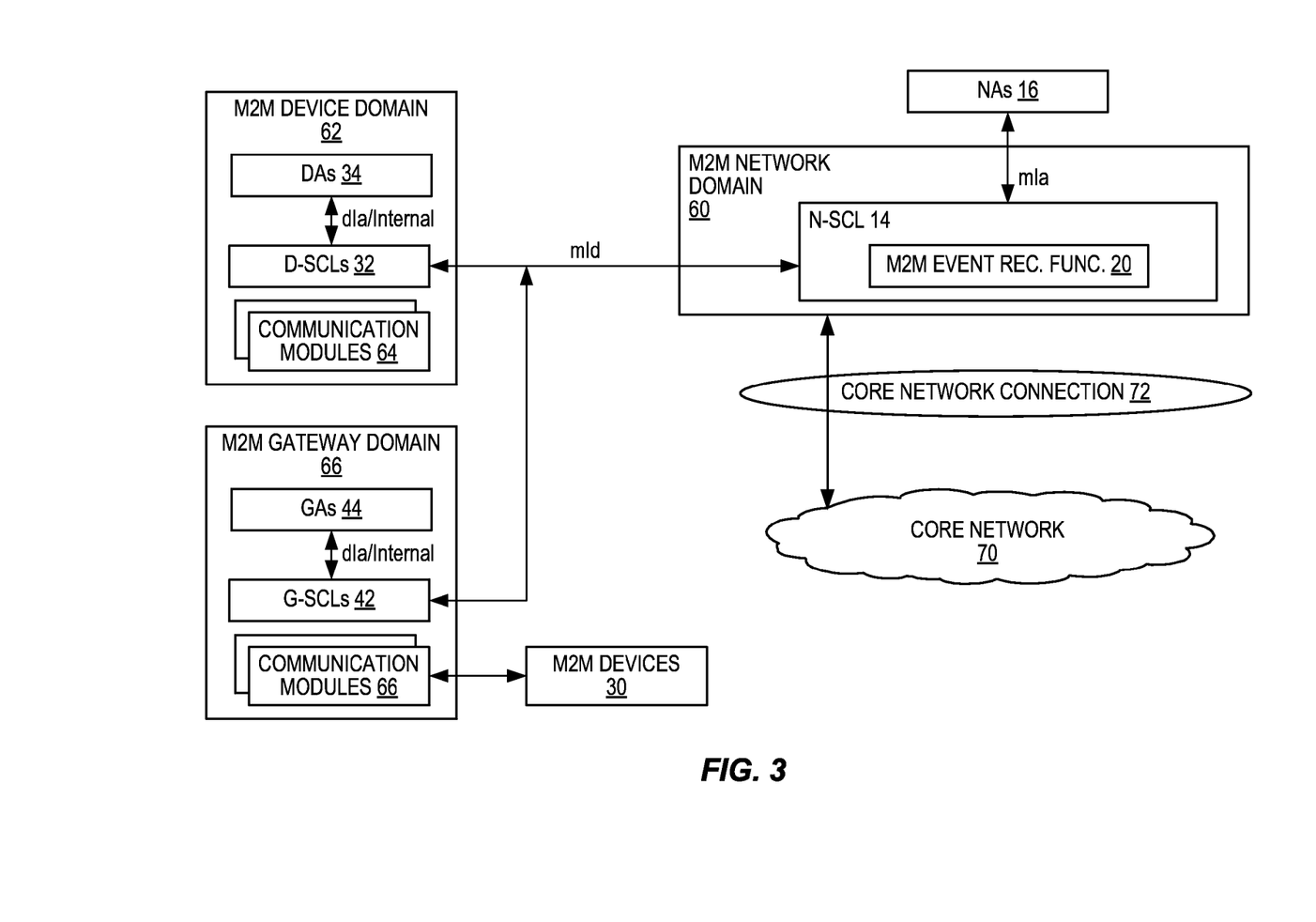
FIGS. 3 and 4 are block diagrams of additional M2M network embodiments.
Figure 4:
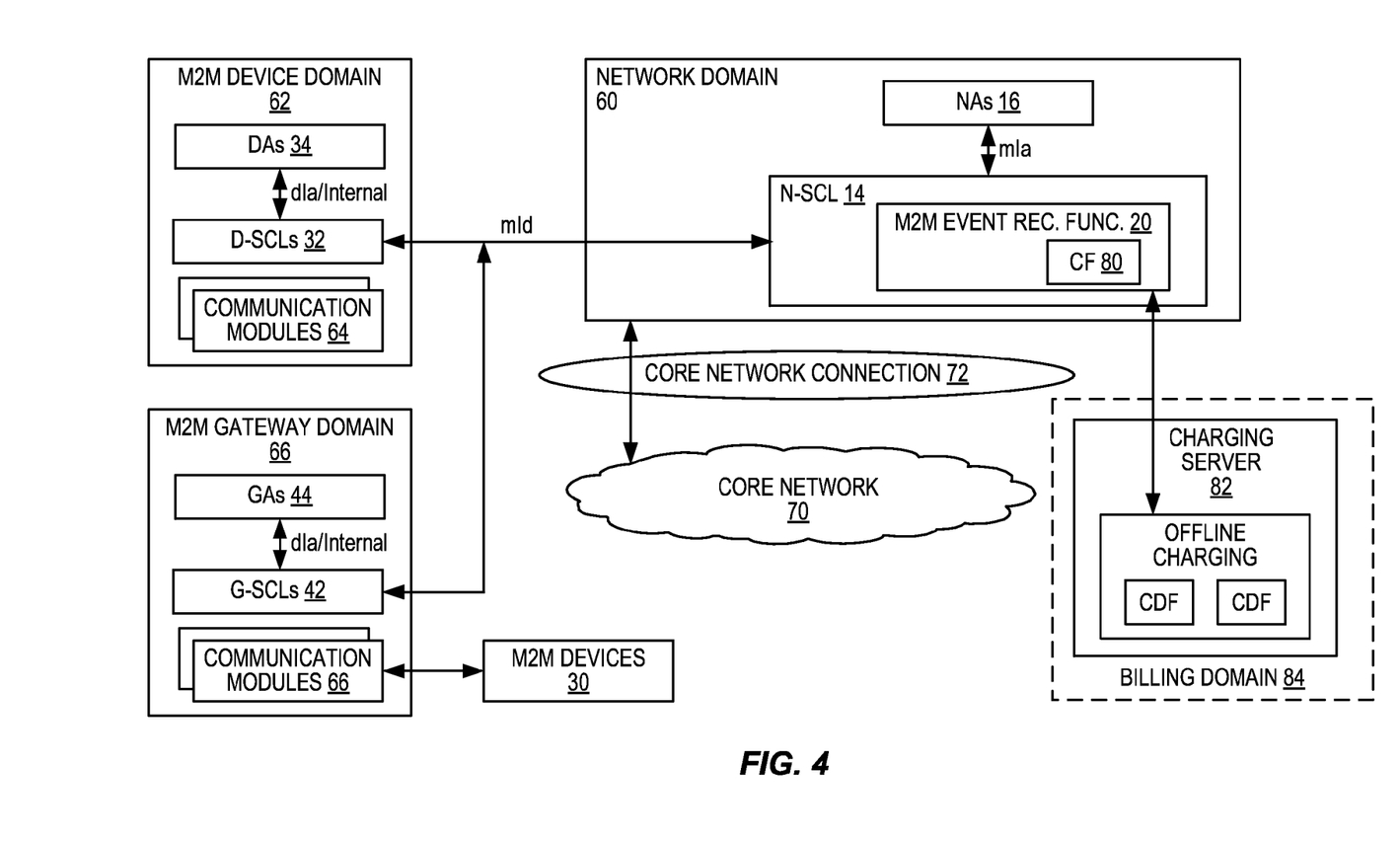

With the above examples in mind, it is recognized herein that various informational elements have to be recorded for statistical and/or charging purposes, both for online and offline charging. An example overall architecture in support of the contemplated information recording is depicted in FIGS. 3 and 4. The M2M event recording function 20 is explicitly shown in both figures, and it provides for recording the desired data. Of course, given the flexibility of programmable computer circuitry, those of ordinary skill in the art will recognize that the M2M event recording function 20 may be embodied as a functional circuit within a CPU or other processor and supporting computer memory.

FIG. 3 represents a functional abstraction of the various domains and entities involved in the M2M network 10, wherein one sees an M2M network domain 60, which is considered as including the N-SCL 14 and the M2M event recording function 20. One further sees an M2M device domain 62, which is considered as including the various D-SCLs 32 and device applications (DAs) 34, and associated communication modules 64. It will be appreciated that the M2M devices 30 are not shown, as the M2M device domain 62 can in an abstract sense be considered as including M2M entities (i.e., the D-SCLs 32 and DAs 34) and not necessarily the physical devices on which those entities are implemented.

FIG. 3 further illustrates an M2M gateway domain 66, with one or more G-SCLs 42 (corresponding to given M2M gateways 40) and their associated gateway applications (GAs) 44, and corresponding communication modules 68 for communicating with any number of M2M devices 30 that connect to the M2M gateway domain 66. Still further, the diagram illustrates that the M2M network domain 60 is communicatively coupled to a core network 70 through a core network connection 72. Those of ordinary skill in the art will recognize that the core network 70 may belong to or otherwise be affiliated with the access network 50 illustrated in FIG. 1. As such, the core network connection 72 and the communications supported thereby allow the M2M network domain 60 to exchange information with the access network domain, e.g., for billing or other purposes.

FIG. 4 illustrates a further example of interaction, wherein the M2M event recording function 20 communicates with a charging server 82 in a billing domain 84. Here, the example charging server 82 includes an offline charging mechanism implementing one or more charging data functions (CDFs). In one or more embodiments, the M2M event recording function 20 is configured to communicate with the charging server 82. For example, the M2M event recording function 20 is configured to send the recorded M2M events, or extracted CDRs from recorded M2M events, to the charging server 82 so that it can correlate access network events—e.g., access bearer establishment and usage within the access network 50—with M2M events in the M2M network 10. Such correlation allows more accurate and/or more granular billing with respect to the usage of access network resources by the M2M entities involved in the M2M events giving rise to such usage.

With that in mind, the N-SCL 14 in one or more embodiments initiates M2M event recording based on any of the following triggers: a request related to an M2M REST-based defined procedure received by the N-SCL 14 from D/GSCL; a request related to an M2M REST-based defined procedure received by the N-SCL 14 from an M2M application (DA, GA, NA); and a request related to an M2M REST-based defined procedure initiated by the N-SCL 14. M2M events involving such M2M requests at the N-SCL 14 will therefore trigger M2M event recording by the M2M event recording function 20. As will be appreciated by those of ordinary skill in the art, "REST" is an acronym for "Representational State Transfer." REST uses a stateless, client-server, cacheable communications protocol. In particular, REST is commonly implemented using the HyperText Transfer Protocol (HTTP).

The actual REST-based procedures to use for triggering M2M event recording is sufficiently flexible so as to be configurable on a per SCL basis, for requests originating/arriving from/at the N-SCL 14 respectively; on a per application basis (NA, GA, DA) basis for requests originating/arriving from/at the N-SCL 14 respectively; and as a default behavior for non-configured SCLs/applications. Configuration for a group of SCLs and applications (NA, GA, DA) that share the same configuration can also be supported under this structure.

The unit of recording by the M2M event recording function is referred to herein as an "M2M event." In a non-limiting example, an M2M event can represent a REST-based request and the corresponding response or it can hold other information. An M2M event is preferably tagged or otherwise characterized, to depict its content. As previously explained, the M2M information elements recorded for any given M2M event are collectively referred to as a recorded M2M event 22. Thus, the M2M event recording function 20 will accumulate multiple recorded M2M events 22 as given M2M events occur.

In more detail for M2M event recording in the REST context, M2M REST-based procedures can be classified as follows: data-related procedures represent procedures associated with data storage or retrieval from the N-SCL 14 (e.g., container related procedures); control-related procedures can be used to represent all procedures that are not associated with data storage/retrieval from the N-SCL 14, with the possible exclusion of group and device management related procedures (e.g., M2M subscription procedures); group related procedures can be used to represent procedures that handle groups; and device management procedures. In at least one embodiment that may be particularly advantageous, each M2M event related to an M2M REST-based procedure is tagged to depict its classification according to the above-described procedure types. The event tag is a mandatory element configurable according to the configuration information 26, in one or more embodiments.

Those of ordinary skill in the art will recognize that the use of REST-based procedures and/or the use of HTTP are non-limiting examples with respect to the N-SCL 14 and its associated method 200. Thus, other procedure types and/or protocols may be used.

FIG. 5 illustrates a table that defines the M2M information elements that are recorded by the M2M event recording function 20 in one or more embodiments, for any given M2M event. Elements marked as "M" or "CM" are mandatory, meaning that they are always captured for each M2M event being recorded, at least to the extent that such information exists for the given M2M event. The elements marked as "0" are optional, meaning that the M2M event recording function 20 does or does not record them for any given M2M event in dependence on the configuration information 26. That is, the configuration information 26 includes one or more parameters that allow the owner or operator of the N-SCL 14 to configure which optional M2M information elements are included in the recorded M2M event 22 captured for any given M2M event.

Broadly, the M2M event recording function 20 can record any of M2M information elements shown in the table, for any of the event-recording triggers discussed. Those of ordinary skill in the art will appreciate that the description of an element as being mandatory or optional in the table makes specific reference to being mandatory to a particular embodiment, and need not be considered as mandatory in all embodiments. For all elements described as being non-mandatory for the exemplary embodiment represented by FIG. 5, the M2M event recording function 20 can be configurable to select any additional desired information to be recorded in addition to the mandatory M2M information elements. This configuration capability can be applied to all or respective ones of the configured REST-based procedures selected for triggering M2M event recording for the N-SCL 14. However, in one or more embodiments contemplated herein, M2M event recording does include the mandatory M2M information elements depicted in FIG. 5, with the motivation being the need to include all relevant M2M identifiers within each recorded M2M event 22, so that it is possible to support multiple charging scenarios.

To enable the M2M event recording function 20 to record the necessary information, as described above, the following associations are preferably maintained by the M2M service provider, e.g., maintained by the M2M event recording function 20: all D-SCL IDs and their allocated M2M subscription IDs; all G-SCL IDs and their allocated M2M subscription IDs; and all application IDs (GA/DA/NA) and their allocated M2M subscription IDs. Using the established associations, as described above, the M2M event recording function 20 can derive the appropriate M2M subscription ID depending on the trigger.

Referring again to FIG. 4, one sees a charging architecture representing an exemplary embodiment contemplated herein. Charging information in the form of CDRs 24 (as shown in FIG. 1) can be derived from the recorded M2M events 22 accumulated by the M2M event recording function 20, and transferred to the charging server 82. The M2M event recording function 20 can derive the CDRs 24 from the corresponding recorded M2M events. In one such embodiment, the CDRs 24 have a one-to-one correspondence with respective ones of the recorded M2M events 22, meaning they contain the same M2M information elements. Of course, such information may appear in the CDRs 24 in a different ordering or in a different structure than used for the recorded M2M events 22, e.g., for compatibility with the charging server 82.

In other embodiments, the mapping between CDRs 24 and recorded M2M events 22 is not one-to-one. For example, the CDR 24 corresponding to a given recorded M2M event 22 may omit certain information that is in the recorded M2M event 22 and/or may include additional information not in the recorded M2M event 22, such as derived or additional information.

Regardless, to facilitate interworking between the M2M network 10 and existing access networks 50, the charging architecture embodied within the M2M event recording function 20/N-SCL 14 can be aligned with existing charging solutions in cellular access networks, based on using existing interfaces to transfer the required information to the charging server 82 for offline charging, such as are defined by the Third Generation Partnership Project or 3GPP. In this respect, the charging function 80 shown in FIG. 4 as being embedded within the M2M event recording function 20 is configured such that it is responsible for interaction with the charging server 82, according to any applicable standards and protocols. Of course, the functionality represented by the charging function 80 may be implemented in any number of ways within the processing resources used to implement the overall M2M event recording function 20.

Also, as noted previously, while the recorded M2M events 22 provide a basis for offline charging, not all of the specified M2M information elements are required to be recorded in all cases and/or may not be required for billing purposes. Hence, the M2M event recording function 20 is configurable in one or more embodiments to generate the CDRs 24 using selected M2M information elements from among those captured in the recorded M2M events 22. As such, it will be understood that M2M information elements captured by the M2M event recording function 20 are configurable according to setting parameters in the configuration information 26. Additionally or alternatively, the CDRs 24 are configurable in the sense that one or more other parameters in the configuration information 26 may be set to control which M2M information elements from the recorded M2M events are included in the CDRs 24.

For example, in one or more embodiments, the M2M event recording function 20 operates with configuration options for the charging function 80 that control the charging information that is transferred to the charging server 82 as the CDRs 24. For example, the REST procedures for determining the content of CDRs 24 transferred to the charging server 82 may be configured on a per-SCL basis, for requests originating/arriving from/at the N-SCL 14, respectively. Additionally, for requests originating/arriving from/at the N-SCL 14, it is contemplated herein to make the content of the CDRs 24 transferred to the charging server 82 configurable on a per-application basis (e.g., per NA, GA and/or DA). Still further, in at least one such embodiment, the M2M event recording function 20/charging function 80 operate according to a default behavior if no specific configuration options are set via the configuration information 26. In such a default mode, all or pre-selected ones of the M2M information elements in the recorded M2M events 22 may be included in the CDRs 24 sent to the charging server 82.

Further, configurations for groups of SCLs and/or groups of applications are supported in one or more embodiments. The charging function 80 can ensure that information selected to be transferred to the charging Server has also been selected for recording. Within this context, the term "charging scenario" refers to any scenario for which an M2M entity can be billed, i.e., a scenario that is deemed billable by the M2M service provider associated with the M2M network 10. Some charging scenarios require a single CDR 24 with respect to a single recorded M2M event 22. Others require multiple CDRs 24 to be generated for the same recorded M2M event 22, e.g., where billing is reconciled on a per M2M entity basis and a CDR 24 must be generated for each M2M entity involved in a given M2M event. Such correlations between recorded M2M events 22 and the CDR(s) 24 to be generated therefrom preferably are defined by the configuration information 26, or are otherwise defined within the M2M event recording function 20.

In one charging scenario, the M2M event in question is a "data storage resource consumption event," where an M2M entity stores application data using containers and related procedures for such purposes. For example, a given M2M entity stores M2M data 18 within the N-SCL 14. Thus, the M2M entity (actually, the owner/subscriber associated therewith) can be billed for the consumption of storage resources within the N-SCL 14, until such time as the resources are deleted. This scenario requires correlation between multiple CDRs 24, to identify the M2M entity that stored the data, the M2M entity that deleted the same data, and the duration of time the data was stored and amount of storage during that time. There will be a corresponding recorded M2M event 22 for every CDR 24 required in this case.

In another example scenario related to charging, a given M2M event is a "data transfer event," in which a given M2M entity retrieves or stores container data. The involved M2M entity can be billed for the amount of transferred data. As such, the recorded M2M event 22 captured for the data transfer event shall include one or more M2M information elements indicating the amount(s) of actual M2M data 18 and/or associated control signaling involved in the data transfer event. There will be a corresponding CDR 24 generated and transferred to the charging server 82 for each recorded M2M event 22 that is associated with a data transfer in this case.

In another example, any given M2M event is a "connectivity event," wherein an M2M entity connects to the N-SCL 14. Such connections frequently involve transfers of small amounts of data (retrieval or storage). In this scenario, the involved M2M entity can be charged for the connectivity, as opposed to the stored amount of data. The same can also be applied to an M2M entity that frequently connects to the N-SCL 14 for retrieval of stored data. A hybrid charging arrangement is also contemplated, wherein CDRs 24 are generated for both connectivity and data storage. It is contemplated herein that two or more related CDRs 24 will be generated so as to include common information, thus allowing them to be correlated by the charging server 82. Thus, if multiple CDRs 24 are generated from a given recorded M2M event 22, those multiple CDRs 24 are related as being generated for the same M2M event within the M2M network 10, and they will include one or more common information elements that allows the charging server 82 to recognize the relationship.

In one contemplated embodiment, the M2M event recording function 20 obtains the IP address of the M2M entity involved in any given M2M event that is captured by the M2M event recording function 20 as a corresponding recorded M2M event 22. The IP address can be included in all CDRs 24 generated for the given M2M event and thus can serve as the common information element that allows the charging server 82 to correlate multiple CDRs 24 to the same event.

This configuration works well when M2M entities use a 3GPP-based cellular network to connect to the M2M network 10, as the IP address assigned by the cellular network can be captured by the M2M event recording function 20 in the recorded M2M event 22 corresponding to any given M2M event involving a so-connected M2M entity. Thus, in one or more embodiments contemplated herein, at least where 3GPP access networks are used to connect to the M2M network 10, the CDRs 24 produced by the M2M event recording function 20 include information identifying the IP addresses of the M2M entities that created the access network bearers to make such connections.

For example, the IP address captured in a given recorded M2M event 22 and/or the CDR(s) 24 generated therefrom, is the same as address as that declared by a D/G-SCL in the M2MPoC resource when it registers with the N-SCL 14. If for some reason, the D/G-SCL declared a Fully Qualified Domain Name (FQDN) in the M2MPoC, the FQDN is resolved to the IP address in question. The M2M recording function 20 includes the IP address associated with the access network 50 in the M2M information elements stored in the corresponding recorded M2M event 22.

The IP address to be included is that of the G/D-SCL 32, 42 or M2M application 16, 34, 44, for requests originating from the N-SCL 14 or arriving at the N-SCL 14. The IP address can be extracted from the M2MPoC associated with the G/D-SCL 32, 42, or application 16, 34, 44, directly or through DNS resolution if a FQDN is declared. It is also contemplated that correlating CDRs 24 based on the included IP address may further include correlating recorded event time stamps, especially if the IP address alone is not sufficient for deeming two CDRs 24 as corresponding to the same recorded M2M event 22.

Broadly, the various embodiments described herein may be implemented via software products stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention.

Those of ordinary skill in the art will appreciate that other instructions and operations necessary to implement the described invention may also be stored on the machine-readable medium. Software running from the machine-readable medium will be understood as running on and/or interfacing with circuitry to perform the described operations.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of recording Machine-to-Machine (M2M) events for a Network Services Capability Layer (N-SCL) within an M2M network, each said M2M event comprising an M2M request, and said method performed by a network server operating in the M2M network and comprising:
    initiating recording of a given M2M event responsive to the corresponding M2M request;
    recording the given M2M event by recording a number of M2M information elements associated with the given M2M event, to thereby obtain a recorded M2M event corresponding to the given M2M event, including recording:
        an access network identifier (ID) associated with the M2M request;
        an M2M event tag characterizing an event class associated with the M2M request;
        an M2M subscription ID associated with the M2M request;
        an M2M application ID associated with the M2M request;
        a time stamp associated with the M2M request;
        a primitive type of the M2M request; and
        an issuer of the M2M request, a receiver targeted by the M2M request, and a target Uniform Resource Locator (URL) associated with the M2M request; and
    performing, by the network server, at least one of the following:
        processing the recorded M2M events to obtain M2M event statistics; and
        transferring the recorded M2M events, or Call Data Records (CDRs) derived therefrom, to a charging server for determining charging related to the recorded M2M events.

2. The method of claim 1, wherein, when the given M2M event involves the creation of an access bearer in an access network by an M2M entity involved in the given M2M event, the method further comprises recording in the corresponding recorded M2M event information identifying an IP address of the M2M entity.

3. The method of claim 1, wherein, when the given M2M event comprises a registration event, in which an M2M entity registers with the N-SCL, the method further comprises obtaining an IP address of the M2M entity from M2M Point-of-Contact (PoC) information provided to the N-SCL during the registration event and including in the corresponding recorded M2M event information that identifies the IP address.

4. The method of claim 1, wherein, when the given M2M event comprises a data storage resource consumption event involving M2M data stored at the N-SCL, the method further comprises including in the corresponding recorded M2M event information that identifies an M2M entity that stored the M2M data, information that identifies any M2M entity that deleted the M2M data, and information that indicates a duration of time that the M2M data was stored at the N-SCL.

5. The method of claim 1, wherein, when the given M2M event that comprises a data transfer event involving M2M data being stored at or retrieved from the N-SCL, the method further comprises including in the corresponding recorded M2M event information that identifies the M2M entity that stored or retrieved the M2M data and information that indicates an amount of information transferred in the data transfer event.

6. The method of claim 5, wherein the information that indicates the amount of information transferred in the data transfer event indicates an amount of M2M data transferred for the data transfer event and further indicates an amount of control information transferred for the data transfer event.

7. The method of claim 1, wherein, when the given M2M event comprises a connectivity event involving an M2M entity connecting to the N-SCL for data storage or retrieval, the method further comprises including in the corresponding recorded M2M event information that identifies the connecting M2M entity.

8. The method of claim 1, further comprising maintaining configuration information that configures M2M event recording by specifying which M2M information elements are recorded for which M2M events according to one or more of: the type of M2M event being recorded; the type or identity of the M2M entity that issued the M2M request corresponding to the M2M event being recorded; the identity or group association of the M2M entity that issued the M2M request; and the type or identity of the M2M entity targeted as the receiver of the M2M request corresponding to the M2M event being recorded.

9. The method of claim 8, wherein the number of M2M information elements recorded for the given M2M event as set forth in claim 1 are mandatory M2M information elements, and wherein the configuration information controls which additional M2M information elements are optionally recorded for the given M2M event.

10. The method of claim 9, wherein the configuration information controls which of the following M2M information elements are recorded as the additional M2M information elements that are optionally recorded for the given M2M event: an indicator of the SCL hosting a targeted resource; a protocol type of the associated M2M request; a header size of the associated M2M request; a header size of an M2M response sent in response to the associated M2M request; a body size of the associated M2M request; a body size of the M2M response; a response code corresponding to the M2M response; a control memory size indicating the amount of memory needed to store control information associated with the given M2M event; a data memory size indicating the amount of memory needed to store data associated with the given M2M event; and additional vendor-specific information particular to an operator or owner of the N-SCL.

11. The method of claim 1, wherein the method further includes recording the M2M IDs for all M2M entities involved in the given M2M event, to support later charging of the M2M event to the involved M2M entities.

12. The method of claim 1, further comprising:
maintaining at the N-SCL the following associations: associations between device SCL identifiers (D-SCL IDs) and correspondingly allocated M2M subscription IDs, associations between Gateway SCL identifiers (G-SCL IDs) and correspondingly allocated M2M subscription IDs, associations between Device Application IDs (DA IDs), Gateway Application IDs (GA IDs), and Network Application IDs (NA IDs), and correspondingly allocated M2M subscription IDs; and
determining the M2M subscription ID associated with the corresponding M2M request based on said associations.

13. The method of claim 1 wherein the corresponding M2M request comprises one of: a request that is related to a defined M2M procedure and is received by the N-SCL from a D-SCL or a G-SCL; a request that is related to a defined M2M procedure and is received by the N-SCL from an 2M application; and a request that is related to a defined M2M procedure and that is initiated by the N-SCL.

14. The method of claim 1, further comprising:
configuring triggers for M2M event recording based on at least one of: a per M2M application basis; a per SCL basis; a per M2M application group basis; and a per SCL group basis; and
controlling M2M event recording for the given M2M event according to the configured triggers, and according to a default behavior if there are no configured triggers.

15. The method of claim 1, further comprising generating a CDR corresponding to a respective one of the recorded M2M events, using a one-to-one mapping of the M2M information elements in the recorded M2M event into the CDR.

16. The method of claim 1, further, when generating two or more CDRs corresponding to the same recorded M2M event or corresponding to two or more related recorded M2M events, including a common information element in the two or more CDRs, thereby enabling them to be identified as being related CDRs.

17. A network server in a Machine-to-Machine (M2M) network comprising:
an interface for communicating with other M2M entities within the M2M network;
a processor operatively associated with the interface and configured to implement an M2M event recording function for recording given M2M events for a Network Services Capability Layer (N-SCL), each M2M event comprising an M2M request and said M2M event recording function being configured to:
initiate recording of a given M2M event responsive to the corresponding M2M request;
record the given M2M event by recording a number of M2M information elements associated with the given M2M event, to thereby obtain a recorded M2M event corresponding to the given M2M event, including recording:
an access network identifier (ID) associated with the M2M request;
an M2M event tag characterizing an event class associated with the M2M request;
an M2M subscription ID associated with the M2M request;
an M2M application ID associated with the M2M request;
a time stamp associated with the M2M request;
a primitive type of the M2M request; and
an issuer of the M2M request, a receiver targeted by the M2M request, and a target Uniform Resource Locator (URL) associated with the M2M request; and
perform at least one of the following:
process the recorded M2M events to obtain M2M event statistics; and
transfer the recorded M2M events, or Call Data Records (CDRs) derived therefrom, to a charging server for determine charging related to the recorded M2M events.

18. The network server of claim 17, wherein, when the given M2M event involves the creation of an access bearer in an access network by an M2M entity involved in the given M2M event, the M2M event recording function is configured to record in the corresponding recorded M2M event information identifying an IP address of the M2M entity.

19. The network server of claim 17, wherein, when the given M2M event comprises a registration event, in which an M2M entity registers with the N-SCL, the M2M event recording function is configured to obtain an IP address of the M2M entity from M2M Point-of-Contact (PoC) information provided to the N-SCL during the registration event and include in the corresponding recorded M2M event information that identifies the IP address.

20. The network server of claim 17, wherein, when the given M2M event that comprises a data storage resource consumption event involving M2M data stored at the N-SCL, the M2M event recording function is configured to include in the corresponding recorded M2M event information that identifies an M2M entity that stored the M2M data, information that identifies an M2M entity that deleted the M2M data, and information that indicates a duration of time that the M2M data was stored at the N-SCL.

21. The network server of claim 17, wherein, when the given M2M event comprises a data transfer event involving M2M data being stored at or retrieved from the N-SCL, the M2M event recording function is configured to include in the corresponding recorded M2M event information that identifies the M2M entity that stored or retrieved the M2M data and information that indicates an amount of information transferred in the data transfer event.

22. The network server of claim 21, wherein the information that indicates the amount of information transferred in the data transfer event indicates an amount of M2M data transferred for the data transfer event and further indicates an amount of control information transferred for the data transfer event.

23. The network server of claim 17, wherein, when the given M2M event comprises a connectivity event involving an M2M entity connecting to the N-SCL for data storage or retrieval, the M2M event recording function is configured to include in the corresponding recorded M2M event information that identifies the connecting M2M entity.

24. The network server of claim 17, wherein the M2M event recording function is configured to use configuration information to configure M2M event recording, said configuration information specifying which M2M information elements are recorded for which M2M events according to one or more of: the type of M2M event being recorded; the type or identity of the M2M entity that issued the M2M request corresponding to the M2M event being recorded; the identity or group association of the M2M entity that issued the M2M request; and the type or identity of the M2M entity targeted as the receiver of the M2M request corresponding to the M2M event being recorded.

25. The network server of claim 24, wherein said number of M2M information elements recorded for the given M2M event as set forth in claim 17 are mandatory M2M information elements, and wherein the configuration information controls which additional M2M information elements are optionally recorded for the given M2M event.

26. The network server of claim 25, wherein the configuration information controls which of the following M2M information elements are recorded as the additional M2M information elements that are optionally recorded for the given M2M event: an indicator of the SCL hosting the targeted receiver; a protocol type of the associated M2M request; a header size of the associated M2M request; a header size of an M2M response sent in response to the associated M2M request; a body size of the associated M2M request; a body size of the M2M response; a response code corresponding to the M2M response; a control memory size indicating the amount of memory needed to store control information associated with the given M2M event; a data memory size indicating the amount of memory needed to store data associated with the given M2M event; and additional vendor-specific information particular to an operator or owner of the N-SCL.

27. The network server of claim 17, wherein the M2M event recording function is configured to include in the corresponding recorded M2M event information identifying the M2M IDs for all M2M entities involved in the given M2M event, to support later charging of the M2M event to the involved M2M entities.

28. The network server of claim 17, wherein the M2M event recording function is configured to:
    maintain the following associations: associations between device SCL identifiers (D-SCL IDs) and correspondingly allocated M2M subscription IDs, associations between Gateway SCL identifiers (G-SCL IDs) and correspondingly allocated M2M subscription IDs, associations between Device Application IDs (DA IDs), Gateway Application IDs (GA IDs), and Network Application IDs (NA IDs), and correspondingly allocated M2M subscription IDs; and
    determine the M2M subscription ID associated with the corresponding M2M request based on said associations.

* * * * *

UNITED STATES PATENT AND TRADEMARK OFFICE
CERTIFICATE OF CORRECTION

| | |
|---|---|
| PATENT NO. | : 9,490,990 B2 |
| APPLICATION NO. | : 13/922938 |
| DATED | : November 8, 2016 |
| INVENTOR(S) | : George Foti |

It is certified that error appears in the above-identified patent and that said Letters Patent is hereby corrected as shown below:

In the Specification

In Column 9, Line 51, delete ""0"" and insert -- "O" --, therefor.

In the Claims

In Column 15, Line 32, in Claim 13, delete "2M" and insert -- M2M --, therefor.

Signed and Sealed this
Fourteenth Day of June, 2022

*Katherine Kelly Vidal*

Katherine Kelly Vidal
*Director of the United States Patent and Trademark Office*